United States Patent [19]

Urban et al.

[11] Patent Number: 4,496,371
[45] Date of Patent: Jan. 29, 1985

[54] PROCESS FOR REMOVAL OF HYDROGEN SULFIDE AND CARBON DIOXIDE FROM GAS STREAMS

[75] Inventors: Peter Urban, Northbrook; Russell W. Johnson, Villa Park, both of Ill.

[73] Assignee: UOP Inc., Des Plaines, Ill.

[21] Appl. No.: 534,227

[22] Filed: Sep. 21, 1983

[51] Int. Cl.³ .......................... C10J 00/00; C10K 1/12
[52] U.S. Cl. ................. 48/197 R; 48/196 A; 48/196 R; 423/221; 423/232; 423/573 R
[58] Field of Search ............... 423/573 G, 573 R, 221, 423/232; 48/196 R, 196 A, 197 R

[56] References Cited

U.S. PATENT DOCUMENTS

| | | | |
|---|---|---|---|
| 2,886,405 | 5/1959 | Benson et al. | 23/3 |
| 3,039,855 | 6/1962 | Urban | 423/573 L |
| 3,773,662 | 11/1973 | Urban | 423/573 |
| 4,160,810 | 7/1979 | Benson et al. | 423/220 |
| 4,315,903 | 2/1982 | Fenton | 423/573 R |
| 4,358,427 | 11/1982 | Urban | 423/230 |
| 4,364,918 | 12/1982 | Espenscheid | 423/573 R |
| 4,367,212 | 1/1983 | Castrantas | 423/573 R |

OTHER PUBLICATIONS

Hydrocarbon Processing, Apr. 1982, p. 93, "Benfield".
Hydrocarbon Processing, Apr. 1982, p. 112, "Stretford".

Primary Examiner—Jay H. Woo
Assistant Examiner—Mike McGurk
Attorney, Agent, or Firm—James R. Hoatson, Jr.; John F. Spears, Jr.; William H. Page II

[57] ABSTRACT

A gas treating process is disclosed. Hydrogen sulfide and carbon dioxide are removed from a hydrocarbon vapor stream by absorption into an aqueous carbonate solution. Hydrogen sulfide picked up by the circulating carbonate solution is oxidized to produce liquid sulfur, which is withdrawn. The carbonate solution is then stripped to release carbon dioxide and produce the lean carbonate solution used for absorption. By-product thiosulfate formed in the oxidation step is eliminated by reaction with hydrogen sulfide. Metal phthalocyanines are used as the catalyst for the elimination of thiosulfate and for the oxidation of hydrogen sulfide.

20 Claims, 1 Drawing Figure

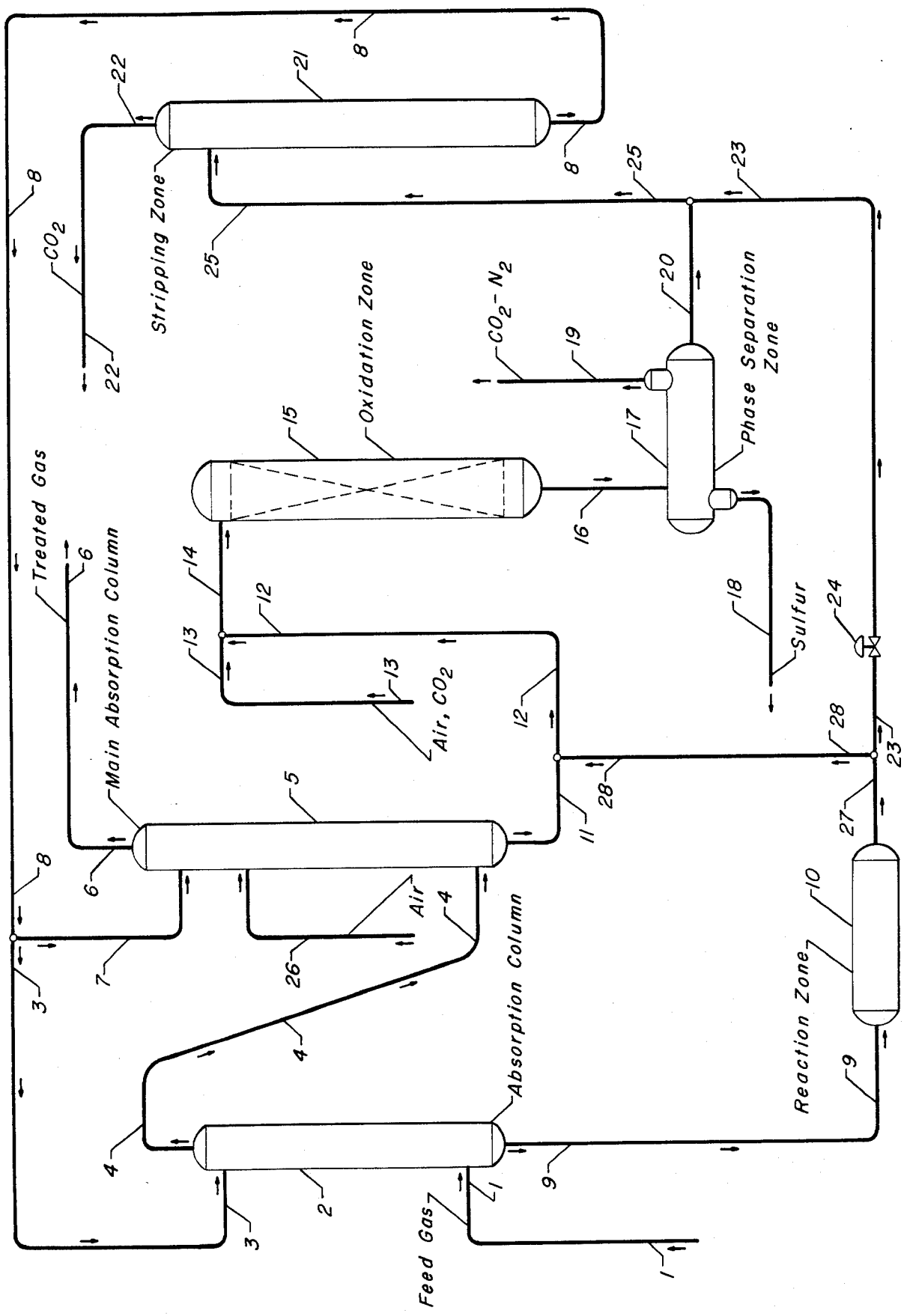

PROCESS FOR REMOVAL OF HYDROGEN SULFIDE AND CARBON DIOXIDE FROM GAS STREAMS

FIELD OF THE INVENTION

The invention relates to a novel gas treating process suitable for treating natural gas streams and synthetic gas streams such as are produced in various industrial processes or in synthetic fuel-producing plants. The invention more specifically relates to a process for the removal of hydrogen sulfide from a gas stream which also comprises hydrogen and/or normally vaporous hydrocarbons. The subject process utilizes an absorption-stripping technique which is similar to several commercially practiced gas treating processes, with the absorbent liquid which circulates through the process being an aqueous carbonate solution. The subject process therefore relates to the removal of the so-called acid gases, hydrogen sulfide and carbon dioxide from a feed gas stream. In addition, the subject process relates to those gas treating processes in which hydrogen sulfide is oxidized to produce elemental sulfur. The field of the subject invention therefore also includes such hydrogen sulfide oxidation processes as the commercially practiced Stretford process.

PRIOR ART

Aqueous carbonate solutions are widely used to remove the common acidic gases, hydrogen sulfide and carbon dioxide, from gas streams. This process is described in some detail in U.S. Pat. Nos. 2,886,405 and 4,160,810. A predominant form of this process is the widely used Benfield process. This process is described in the two just cited U.S. patents and in a brief summary presented at page 93 of the April 1982 issue of *Hydrocarbon Processing*. In processes of this type, the feed gas stream enters the lower portion of an absorber and passes upward countercurrent to a lean aqueous carbonate solution which enters an upper portion of the absorber. This produces a purified product gas stream and a rich aqueous carbonate solution which contains the acid gas removed from the feed gas stream. The rich solution is then passed into a regenerator commonly referred to as a stripping column. A lower pressure and/or higher temperature maintained within the stripping column results in the release of the absorbed acid gases which are removed overhead from the stripping column. This regeneration procedure also produces a stream of lean carbonate solution which is recycled to the top of the absorber.

A second common gas treating process is referred to as the Stretford process. This process utilizes a circulating aqueous carbonate solution which normally contains a salt of an oxyacid of pentavalent vanadium and the salts of anthraquinone disulfonic acids (ADA) and/or hydroanthraquinone disulfonic acids. A basic feature of the Stretford process is that hydrogen sulfide is oxidized to produce elemental sulfur. Oxygen for this reaction is provided by the reduction of the vanadium compound. The oxidation reaction occurs in an oxidation zone which is separate from an absorber in which the feed gas stream passes countercurrent to the carbonate solution. The vanadium compound is subsequently oxidized to a higher oxidation state through a redox reaction with the ADA. The ADA is reoxidized by oxygen present in air supplied to the oxidation zone. The Stretford process is described at page 112 of the April 1982 issue of *Hydrocarbon Processing*.

An inherent problem of hydrogen sulfide oxidation processes such as the Stretford process is the formation of oxidation by-products. The major by-product is thiosulfate. The thiosulfate will remain in the circulating carbonate solution and will eventually accumulate to a level which is detrimental to the operation of the process. Those skilled in the art are cognizant of this operational problem and have devised workable solutions. For instance, in U.S. Pat. No. 4,364,918, a purge stream removed from the Stretford-type process is treated with a nickel ethylenediamine complex to remove the thiosulfate. U.S. Pat. No. 4,367,212 describes a process in which the concentration of thiosulfate in the circulating absorption medium is controlled by injecting a peroxygen chemical such as aqueous hydrogen peroxide into the alkaline solution.

U.S. Pat. No. 4,358,427 is pertinent for its teaching of a process for the removal of hydrogen sulfide from steam by the catalyzed oxidation of hydrogen sulfide to sulfur. This is a vapor phase process. The preferred catalyst is a metal phthalocyanine compound supported on a solid support such as activated carbon. This catalyst may be employed within the oxidation zone of the subject process.

BRIEF SUMMARY OF THE INVENTION

The subject invention provides a gas treating process for the removal of both hydrogen sulfide and carbon dioxide from a hydrocarbon-containing gas stream. The subject process is an improvement over the prior art processes in which sulfur compounds are oxidized to elemental sulfur in that by-product thiosulfate is internally converted by reduction to elemental sulfur. The subject invention is also distinguished by a preference for operation at a higher temperature, which increases reaction rates. Higher operating temperatures in the main oxidation zone result in the formation of liquid sulfur rather than solid sulfur. The production of liquid sulfur greatly eases the separation of the product sulfur from the recycling alkaline solution thereby eliminating some operational problems found in prior art processes.

One broad embodiment of the subject invention may be characterized as a gas treating process which comprises the steps of contacting a feed gas stream which comprises a normally vaporous hydrocarbon, hydrogen sulfide and carbon dioxide with a hereinafter characterized first liquid stream, which comprises an aqueous carbonate solution, in an absorption zone operated under absorption conditions which promote the removal of hydrogen sulfide and carbon dioxide from the feed gas stream, and producing a treated gas stream and a second liquid stream comprising the aqueous carbonate solution, which is rich in hydrogen sulfide and carbon dioxide; passing at least a portion of the second liquid stream into an oxidation zone wherein the second liquid stream is admixed with an oxygen-containing gas stream in the presence of an oxidation catalyst under conditions which promote the oxidation of hydrogen sulfide to sulfur, including a temperature at which sulfur is present as a liquid, and thereby effecting the production of a mixed phase stream comprising liquid sulfur and the aqueous carbonate solution, which contains thiosulfate ions and is rich in carbon dioxide; separating the mixed phase stream in a phase separation zone and producing a liquid phase sulfur stream, which is withdrawn from the process, and a third liquid stream comprising the aqueous carbonate solution and which is rich in carbon dioxide; and passing the third liquid stream into a stripping zone operated at stripping conditions effective to effect the production of a first vapor stream comprising carbon dioxide, which is withdrawn from the process, and a fourth liquid stream comprising the aqueous carbonate solution which is lean in both hydrogen sulfide and carbon dioxide, and recycling at least a portion of the fourth liquid stream to the absorption zone as the previously referred to first liquid stream.

BRIEF DESCRIPTION OF THE DRAWING

The drawing is a simplified process flow diagram illustrating several embodiments of the subject process. This process flow diagram has been simplified in that it does not show the many pieces of mechanical apparatus normally found on such a process including pumps, pressure, temperature and flow rate monitoring and control systems, vessel internals, stripping column reflux and reboiling systems, etc.

Referring now to the drawing, a feed gas stream which comprises an admixture of methane, ethane, hydrogen sulfide, and carbon dioxide enters a preliminary absorption column 2 through line 1. The feed gas stream travels upward through the absorption column countercurrently to a descending stream of potassium carbonate delivered to the absorption column through line 3. The absorption column 2 is operated at conditions which effect a fairly selective removal of a portion of the hydrogen sulfide from the feed gas stream to result in the production of a gas stream carried by line 4 which has a lower hydrogen sulfide concentration than the feed gas stream but still contains substantially all of the other components of the feed gas stream at the same quantity as the feed gas stream. A stream of carbonate solution which is relatively rich in hydrogen sulfide as compared to the stream carried by line 3.

After passing through the absorption column 2, the remaining components of the feed gas stream are transferred through line 4 into the main absorption column 5. The gas stream passes upward countercurrent to the lean aqueous potassium carbonate solution delivered to the top of the absorption column 5 by line 7. This absorption column is maintained at conditions which result in the transfer of substantially all the hydrogen sulfide and carbon dioxide present in the entering gases to the carbonate solution and thereby produces a treated gas stream removed through line 6 which is free of hydrogen sulfide and carbon dioxide. If desired, a supplemental air stream may be injected into an upper portion of the absorption column 5 through line 26 to effect the oxidation of any residual amount of hydrogen sulfide present in the upper portion of the absorption column. A carbonate solution which is rich in both hydrogen sulfide and carbon dioxide is removed from the absorption column 5 through line 11.

The hydrogen sulfide-rich alkaline solution flowing through line 9 enters a reaction zone 10 maintained at an elevated temperature. Preferably, in the presence of a catalyst, hydrogen sulfide reacts with thiosulfate present in the circulating carbonate solution. This results in a reduction of the thiosulfate to elemental sulfur and the production of a liquid stream carried by line 27 which comprises a mixture of the carbonate solution, polysulfides, and elemental sulfur. The carbonate solution at this point may still contain hydrogen sulfide picked up in the absorption column 2. The liquid stream flowing through line 27 will normally flow through line 28 and join the liquid stream withdrawn from the main absorption column through line 11 before being transferred into an oxidation zone 15 through lines 12 and 14. The entering carbonate solution flows downward through a packed bed located within the oxidation zone in admixture with carbon dioxide-enriched air from line 13.

In the oxidation zone, the hydrogen sulfide carried by the carbonate solution is preferably oxidized to elemental sulfur in a reaction which is catalyzed by an oxidation catalyst present within the packed bed and a catalyst which is dissolved in the circulating carbonate solution. The oxidation zone is maintained at an elevated temperature which results in the sulfur which is produced being present in the form of a liquid rather than a solid. The oxidation zone effluent stream therefore is a mixed phase stream comprising the residual components of the gas which enters through line 13, the aqueous carbonate solution (still containing carbon dioxide picked up in the absorption columns) and liquid sulfur. The oxidation zone effluent stream is passed through line 16 into the phase separation zone 17 wherein, due to quiescent conditions and a suitable residence time, the entering materials separate into a vapor stream comprising $CO_2$ and nitrogen removed through line 19, liquid phase sulfur which is decanted through line 18, and the aqueous carbonate solution which is withdrawn through line 20. The carbonate solution will contain water-soluble oxidation by-products including thiosulfate ions.

The carbonate solution is passed into a stripping zone 21 through line 25. The stripping zone is operated at suitable conditions including an elevated temperature and reduced pressure which result in the release of the carbon dioxide present in the carbonate solution. This effects the production of a carbon dioxide stream which is removed from the process in line 22 and a lean carbonate solution which is withdrawn from the stripping zone through line 8 and recycled to the absorption column. As an alternative mode of operation, a portion of the admixture flowing through line 27 may be passed through line 23 by opening normally closed valve 24. This alternative would be employed only when it is acceptable for hydrogen sulfide to be present in the carbon dioxide off-gas stream removed through line 22. This description of several embodiments of the invention is not intended to preclude from the scope of the subject invention those other embodiments set out herein or which are the result of the normal and reasonably expected modifications of those embodiments.

DETAILED DESCRIPTION

Processes for the removal of hydrogen sulfide from gas streams are important today in several different areas. In many of these instances, it is often necessary or desirable to also remove carbon dioxide from the feed gas stream which is being treated. For instance, it is normally desired to remove hydrogen sulfide from natural gas streams. The objective of this treatment may be to reduce the ultimate emissions of sulfur into the atmosphere when the natural gas is combusted or otherwise used in an industrial or residential application, or to eliminate the health and safety problems associated with processing and transporting a gas stream which originally contains significant amounts of hydrogen sulfide, or to recover the sulfur as a separate product. The removal of carbon dioxide may be desirable for the purpose of raising the heating value of the gas stream or for the recovery of the carbon dioxide. Carbon dioxide recovered in this manner can be used in enhanced oil recovery techniques which are being employed on a greater scale due to the elevated price of petroleum products. Carbon dioxide is also used in various industries such as the production of carbonated beverages and as a refrigerant. Another instance in which it may be desirable to remove both hydrogen sulfide and carbon dioxide from a gas stream arises in the synthetic fuel industries wherein light hydrocarbons are being manufactured from coal and other readily available carbon sources which contain substantial amounts of sulfur.

These established needs for processes for the removal of hydrogen sulfide from gas streams has prompted the development of a number of commercially practiced gas treating processes. Although the available processes, of which there are several, can successfully remove hydrogen sulfide from a variety of gas streams, these processes do suffer a number of drawbacks which have been recognized in the art. For instance, the predominant processes in which hydrogen sulfide is oxidized to elemental sulfur suffer from problems associated with the production of by-product thiosulfate. This thiosulfate must be either withdrawn by means of a purge stream or accommodated in some other manner which adds to the capital cost and operating cost of the process. For instance, when a thiosulfate is withdrawn from a purge stream and disposed of in some manner, there is withdrawn from the process as a portion of the purge stream both the carbonate material which is being utilized as the absorbent liquid and any other chemical compound employed within the process such as the vanadium salts. The presence of the vanadium salts and these other compounds is often detrimental to the further utilization of the purge stream or the conversion of the purge stream material into a salable product such as fertilizer. Variations of the oxidation process in which the thiosulfate is reduced through the addition of various chemical compounds suffer from the increased operating cost of continuously supplying these compounds to the process.

Another limitation prevalent in commercial gas treating processes in which the hydrogen sulfide is oxidized is a limitation of the operating temperature within the process to below about 120° F. This rather severe temperature limitation is imposed mainly for the purpose of limiting the rate of formation of thiosulfate within the process. Because of this low operating temperature, the elemental sulfur produced in the process is in the form of a solid particle suspended in the carbonate solution. It is therefore necessary to physically separate the fine sulfur particles or flakes from the liquid solution as through the use of filters and centrifuges. This also increases both the operational problems and costs and the capital cost of this type of process. Another problem which is present in some processes of this type is that they are adversely affected by high $CO_2$ partial pressures in the feed gas which cause the system to operate at a lower pH and reduces the efficiency of the process.

It is therefore an objective of the subject invention to provide a simple and economical hydrocarbon gas treating process. It is a further objective of the subject invention to provide a process for simultaneously removing hydrogen sulfide and carbon dioxide from a gas stream containing a light hydrocarbon. It is another objective of the subject invention to provide a gas treating process in which hydrogen sulfide is oxidized to elemental sulfur which is withdrawn from the process as a liquid. A further objective of the subject invention is to provide a gas treating process for the removal of hydrogen sulfide which is not troubled by the accumulation of thiosulfate and which does not produce sizable purge streams. Another objective of the subject invention is to provide a gas treating process which does not consume significant amounts of any chemical compound employed in the process.

The feed stream to the subject process must contain one or more desirable chemical compounds which are to pass through the process unaffected. These compounds are preferably hydrocarbons which are vaporous in the conditions of temperature and pressure present within the process. The feed gas stream may therefore be rich in pentane or hexanes and similar hydrocarbons such as olefinic hydrocarbons. Preferably, the predominant compounds in the feed stream are normally gaseous hydrocarbons such as methane, ethane, propane, and propylene, with the preferred feed streams therefore comprising one or more hydrocarbons having from one to four carbon atoms per molecule. The feed stream may also contain quantities of hydrogen and water vapor, with the hydrogen passing through the process in much the same manner as the hydrocarbons. The feed stream must also contain hydrogen sulfide and carbon dioxide. There is no requirement that either the hydrogen sulfide or the carbon dioxide is the predominant impurity compound as the process is widely adaptable to treating gas streams which contain either more hydrogen sulfide or more carbon dioxide. There is also believed to be no limit as to the maximum concentration of hydrogen sulfide, carbon dioxide, or hydrocarbons.

The feed gas stream to the subject process is passed into an absorption zone. Preferably, the absorption zone comprises two vertical trayed columns arranged in a manner similar to that shown in the drawing. However, the use of this arrangement is entirely optional and the entire feed gas stream may pass into a single absorption column in which it is contacted with only a single stream of the absorbent liquid. Those skilled in the art will recognize that a large number of different types of apparatus may be employed to achieve the required vapor-liquid contacting between the feed gas stream and the absorbent liquid. The exact type of apparatus employed to achieve this contacting does not affect the operation of the process as long as the contacting is performed in a commercially acceptable and efficient manner. The absorption zone may therefore comprise the preferred vertical trayed columns, vertical packed columns or various types of mechanical admixing devices including other types of trays or spray nozzles, etc.

In the embodiment shown in the drawing, the preliminary absorption column 2 is smaller than the main absorption column 5 since the function of the column 2 is basically to selectively pick up hydrogen sulfide for the reduction of thiosulfate which it is desired to reduce in the reaction zone 10 in the manner set out below. The function of the main absorption column 5 is to remove the total remaining amount of hydrogen sulfide and carbon dioxide which it is desired to remove from the gas stream being treated. This may be achieved through judicious design and operation of the absorption zone based on known engineering principles and the absorptive characteristics of the circulating absorptive liquid.

Although two separate absorption vessels are shown in the drawing, the two absorption steps can be performed in a single vessel as by the use of a liquid removal or trap out tray located at an intermediate height in the column. The liquid stream of line 11 would be removed at this point. This stream could be equal to all of the lean carbonate charged to the top of the absorption column or to just a portion. If all of the descending liquid is withdrawn at this point, the second carbonate stream of line 3 would be passed into this unitary column immediately below the draw-off point. In yet another variation, all of the carbonate solution passes through a single absorption zone and the resultant rich carbonate solution is divided into a first portion passed into the oxidation zone and a smaller second portion, which is passed into the reaction zone for thiosulfate reduction.

The absorption zone is maintained at absorption-promoting conditions which are chosen based on such factors as the delivery pressure of the feed gas stream and the absorptive characteristics of the circulating carbonate stream. The absorption-promoting conditions will normally comprise a superatmospheric pressure in excess of about 50 psia up to about 500 psia. However, there is no upper limit to the pressure which may be employed within the absorption zone and a pressure on the order of 1000 or 2000 psia could be employed if so desired. These relatively high pressures could be desirable when the feed gas stream is being circulated through a process which operates at these pressures. The normal situation is that the feed gas stream will be at a relatively low pressure and the utilities cost of pressurizing the feed gas stream will dictate the operation of the process at a pressure near that of the feed gas stream as it is supplied to the process. The absorption zone may be operated at an ambient temperature in the range of from about 10° to about 50° C., with lower temperatures being desirable as they favor absorption. However, the subject process is not limited to these temperatures and if the absorptive characteristics of the absorbent liquid permit, the absorption zone may be operated at temperatures up to and including 220° C. Those skilled in the art are cognizant of the fact that the operation of the absorption zone at an elevated temperature may require higher pressures and increased circulation rates of the carbonate solution. The ratio of liquid to gas passing through the absorption zone is set by the absorptive characteristics of the carbonate solution, the operating conditions of temperature and pressure, the concentration of hydrogen sulfide and carbon dioxide in the feed gas stream, and the degree to which it is desired to remove these compounds from the feed gas stream.

The absorptive liquid which is circulated through the process is an aqueous solution of a carbonate. The carbonate may be chosen from ammonium carbonate, sodium carbonate or potassium carbonate, with potassium carbonate being preferred. It is believed that the subject process is not limited to operation with these three carbonates and any other carbonate which is commercially suitable may be employed. The carbonate solution should contain between about 10 and about 45% by weight carbonate. Particularly preferred is a solution of from about 20 to about 35% by weight potassium carbonate based on potassium being present as potassium carbonate. Potassium carbonate solutions are often "activated" by small amounts of additives such as amines, alkali metal borates, or amino acids. The trialkanol amines or other tertiary amines are highly suitable as such activating agents. Diethanolamine may also be employed if preferred. The amount of the activating agent is preferably from about 1 to 10 wt.% of the total carbonate solution and more preferably is less than 5 wt.% of the solution. Monoethanolamine can be employed at higher concentrations up to 25 wt.% of the solution.

The aqueous carbonate solutions which are discharged from the absorption zone, and any of the aqueous carbonate solution which is passed through the optional reaction zone, are charged to an oxidation zone. The oxidation zone preferably comprises a single vertically oriented process vessel containing a fixed bed of packing material. Suitable packing materials are inert contact medium such as Munters packing or an activated carbon. The packing material may support or have admixed therein the oxidation catalyst which is employed within the oxidation zone. The carbonate liquid preferably passes downward through this packed bed in admixture with at least a stoichiometrically sufficient amount of vapor phase oxygen to oxidize hydrogen sulfide contained in the entering carbonate solution to elemental sulfur. A small excess amount of oxygen over the stoichiometrically required amount is preferred. This oxygen may be supplied by any suitable source but preferably is provided by passing air directly into the oxidation zone. The use of air results in the effluent of the oxidation zone containing a substantial amount of the inert gases which are predominantly nitrogen. These inert gases must be vented in the downstream separation zone and may create offgas treatment problems. For this reason, it may be desirable to supply oxygen to the oxidation zone in the form of relatively pure gaseous oxygen if an economical source is available.

The oxidation zone is maintained at oxidation-promoting conditions, which may be similar to those conditions employed in the absorption zone. However, the temperature maintained within the oxidation zone is preferably sufficiently high that the elemental sulfur produced by the oxidation of hydrogen sulfide will be present as a liquid. Therefore, in one embodiment, it is preferred that the oxidation zone is operated at a temperature above about 120° C. Temperatures much above that minimum required for the maintenance of liquid phase sulfur do not provide any significant operating advantage and it is therefore preferred that the oxidation zone is operated at a temperature below about 155° C., although the oxidation zone may be operated at higher temperatures up to about 220° C. The pressure maintained in the oxidation zone may vary from about 15 to about 1000 psia or more, with pressures substantially equal to that maintained in the absorption zone being preferred. Any temperature increase, and/or pressure decrease relative to the operating conditions in the absorption zone, should not be of such a nature that any substantial amount of carbon dioxide is released from the carbonate solution within the oxidation zone. The pH of the process streams employed in the process is to a large extent set by the composition of the carbonate-bicarbonate system employed as the absorptive liquid. Although the pH could range up to about 11, it is highly preferred that the carbonate solution be maintained at a pH between about 8 and 10. The preferred method of pH control is by adjusting the rate of carbon dioxide elimination from the system, as by controlling the rate of carbon dioxide rejection in the stripping column.

The preferred oxidation catalyst may be utilized in a form which is soluble or suspended in the carbonate solution or the catalyst may be placed on the solid contact material present in the oxidation zone. In another embodiment of the invention, the catalyst is present both on the contacting material of the oxidation zone and within the circulating carbonate solution. If the catalyst is present in the carbonate solution, it is preferably present at a concentration of from about 5 to about 1000 wt. ppm. The preferred oxidation catalyst comprises a metal phthalocyanine compound. Specific examples of these materials are cobalt phthalocyanine and vanadium phthalocyanine with cobalt phthalocyanine being preferred. If the catalyst is present in the circulating solution, it is preferably in the form of a tetrasulfonate, carboxylate, or nitrate derivatives. Activated charcoals are the preferred solid support material for a fixed bed type of catalyst, with either animal or vegetable charcoals being usable. Preferably, the metal phthalocyanine compound comprises about 0.1 to about 40 wt.% of a final solid catalyst composite. Preferred activated carbons have a majority of the pore diameters in the area of 730 angstroms in size and having a high oxygen content and hydrophilic characteristics. Activated carbons of this nature may also be used by themselves as catalysts in this vessel. It is preferred that the carbon has a bulk density less than 0.55 grams/cc, a pore volume greater than 0.3 cc/gram and the ability to retain oxygen in an available form. Further details in regard to oxidation catalysts may be obtained by reference to U.S. Pat. No. 4,358,427.

When properly operated in the preferred manner, the oxidation zone effluent stream will comprise an admixture of liquid phase sulfur, any residual gases derived from the oxygen-containing stream charged to the oxidation zone and the circulating carbonate solution which at this point will still be rich in carbon dioxide but will be lean in hydrogen sulfide. This mixed phase effluent stream is passed into a phase separation zone which is preferably a horizontally oriented cylindrical process vessel. The vessel may contain various baffles and separation-promoting means to produce a rather selective separation of the entering materials into a liquid phase of relatively high purity sulfur, a second less dense liquid phase comprising the carbon dioxide-rich aqueous carbonate solution, and a vapor phase comprising the residual gases. The denser sulfur stream is removed from the phase separation zone and may be passed to the appropriate product finishing facilities where it is transformed into the desired form for storage or transportation. The liquid phase sulfur can alternatively be passed directly into a subsequent process unit in which it is transformed into a different product such as sulfuric acid, fertilizer, etc. The residual gases are vented to the appropriate vapor handling facilities. The aqueous stream will contain the various water-soluble by-products of the hydrogen sulfide oxidation. These by-products include thiosulfate. The phase separation zone is preferably operated at essentially the same pressure and temperature as the oxidation zone. The use of the same pressure is desirable to simplify the operation of the process, and again the main temperature preference is that the temperature is sufficient to maintain the sulfur as a liquid.

The aqueous carbonate solution which is withdrawn from the phase separation zone is passed into a stripping column wherein the carbonate solution is regenerated in a manner similar to that employed in other processes which utilize a carbonate solution for scrubbing $H_2S$ from a gas stream. The carbonate solution will therefore normally be fed into an upper portion of a vertical stripping column containing vapor-liquid contacting trays or a fixed bed of suitable packing material. Preferably, the carbonate solution is substantially reduced in pressure immediately before being passed into the stripping column, with this pressure reduction resulting in the release of carbon dioxide from the carbonate solution. The regeneration of the carbonate solution is normally aided by hot vapors which rise through the stripping column countercurrent to the descending carbonate solution. These vapors may be produced utilizing an indirect heat exchange means (reboiler) located at the bottom of the stripping column in a relatively conventional manner or in somewhat more complicated but also more energy-efficient methods such as those described in U.S. Pat. No. 4,160,810. The pressure maintained within the stripping zone will preferably be substantially lower than that maintained in other portions of the process and will normally range from between about 15 and about 50 psia, although higher pressures could possibly be employed when the absorption zone is operated at high pressures. The temperature required within the stripping zone will depend on the pressure maintained within the stripping zone and the absorptive characteristics of the carbonate solution. It is preferred that the temperature within the stripping zone does not exceed 220° C. The stripping zone is normally refluxed with water condensed out of the total overhead vapor stream. Operating at elevated temperatures and pressure allows a more complete condensation of the water to be achieved without the use of extensive refrigeration capacity, and therefore reduces the cooling utilities cost of the stripping operation.

A properly designed and operated stripping zone will produce a net bottoms liquid stream comprising a lean carbonate solution, which may contain the oxidation catalyst if this form of catalyst is being employed. This carbonate solution will be lean in both hydrogen sulfide and carbon dioxide. As used herein, the term "rich" is intended to indicate that the absorption liquid has passed through an absorption zone and that the indicated chemical compound has been transferred to the absorption liquid from the gas stream being treated. The use of this term is not intended to indicate a preference for either physical or chemical absorption of the compounds removed from the feed gas stream. Normally the hydrogen sulfide will be converted to the hydrosulfide and the carbon dioxide will become a portion of a bicarbonate. The fact that the absorbed chemical compounds may lose their identity while they are carried through the process by the absorptive liquid is generally recognized in the common usage of these descriptive terms as they are applied to the absorptive liquid. To further define the usage of these terms herein, it may be noted that any portion of the carbonate stream which is withdrawn from the phase separation zone and is subsequently exposed to hydrogen sulfide under absorption-promoting conditions will be referred to herein as a hydrogen sulfide-rich carbonate stream. In a similar manner, any carbonate stream circulating through this process which subsequent to its withdrawal from the stripping zone is brought into contact with carbon dioxide at suitable absorption-promoting conditions will be referred to herein as a carbon dioxide-rich carbonate solution. However, it must be recognized that in the preferred embodiment of the invention as illustrated in the drawing, a portion of the carbonate solution is passed through a primary absorption column under conditions which are chosen to selectively absorb hydrogen sulfide. The carbonate solution which is produced in this absorption column preferably does not contain any sizable amount of carbon dioxide removed from the feed gas stream in this column. Nevertheless, some small amount of carbon dioxide will be unavoidably picked up by the carbonate solution. The carbonate solution being withdrawn from this initial absorption column is therefore referred to herein as a hydrogen sulfide-rich but carbon dioxide-lean carbonate solution.

A preferred embodiment of the subject process may be characterized as a gas treating process which comprises the steps of contacting a feed gas stream which comprises a normally vaporous hydrocarbon, hydrogen sulfide and carbon dioxide with a first liquid stream which comprises a lean aqueous carbonate solution containing thiosulfate ions in a first absorption zone operated under conditions which promote the selective removal of hydrogen sulfide from the feed gas stream and thereby producing a first vapor stream, which comprises the normally vaporous hydrocarbon, hydrogen sulfide and carbon dioxide, and a second liquid stream comprising the aqueous carbonate solution and which is rich in hydrogen sulfide; contacting the first vapor stream with a third liquid stream which comprises a lean aqueous carbonate solution in a second absorption zone operated under conditions which effect the removal of hydrogen sulfide and carbon dioxide from the first vapor stream and thereby producing a treated gas stream, which is withdrawn from the process, and a fourth liquid stream comprising the aqueous carbonate solution and which is rich in hydrogen sulfide and carbon dioxide; passing the second liquid stream through a reaction zone in which a reaction between hydrogen sulfide and a thiosulfate is catalytically promoted at conditions which result in the formation of sulfur; contacting at least major portions of the second liquid stream and the fourth liquid stream with an oxygen-containing gas stream in an oxidation zone in the presence of an oxidation catalyst under conditions which promote the oxidation of hydrogen sulfide to sulfur, including a temperature at which sulfur is present as a liquid, and effecting the production of a mixed phase stream comprising liquid sulfur, the aqueous carbonate solution and residual compounds present in the oxygen-containing gas stream; separating the mixed phase stream in a phase separation zone and thereby producing an effluent gas stream, a liquid phase sulfur stream which is withdrawn from the process, and a fifth liquid stream comprising the aqueous carbonate solution and which is rich in carbon dioxide; and releasing carbon dioxide from the fifth liquid stream in a stripping zone operated at stripping conditions and thereby producing a second vapor stream, which comprises carbon dioxide, and is withdrawn from the process, and a sixth liquid stream comprising an aqueous carbonate solution comprising thiosulfate ions which is lean in both hydrogen sulfide and carbon dioxide, and recycling at least a portion of the sixth liquid stream to the first and the second absorption zones as the first and the third liquid streams.

As described above, it is preferred that the carbonate solution removed from the initial or first absorption column is passed into a reductive reaction zone prior to passage into the oxidation zone. The function of the reaction zone is the elimination of thiosulfate by the reaction of the thiosulfate with hydrogen sulfide carried by the carbonate solution. This reaction is catalyzed by the preferred oxidation catalyst. The oxidation catalyst may therefore be brought into contact with the reactants in the reductive reaction zone through the presence of the oxidation catalyst in the circulating carbonate solution. Alternatively, a separate bed of a supported catalyst may be provided. As in the case of the oxidation zone, the catalyst may be present in both forms. It is preferred that a fixed bed of the solid catalyst is present in the oxidation zone but that no fixed bed of solid catalyst is present in the reaction zone. This requires the presence of the catalyst in the carbonate solution, with this preference also leading to catalyst being present in both forms in the oxidation zone. Although the reaction zone (19) is characterized herein as being a thiosulfate reduction zone, it must be recognized that this zone functions as a hydrogen sulfide oxidation zone wherein the thiosulfate ions provide the oxygen. The catalyst may therefore be considered as operating as an oxidation catalyst in both conversion zones. If a separate reduction catalyst is desired, a catalyst similar in nature to that described in U.S. Pat. No. 3,725,303 may be employed.

The carbonate solution is preferably heated to a temperature above about 100° C. before entering the reductive reaction zone. More preferably, the reaction zone is maintained at a temperature above about 150° C. The consumption of thiosulfate in the reaction zone will normally be limited by the available mass of hydrogen sulfide. For this reason, the initial absorption zone is sized and operated in a manner which provides an excess of hydrogen sulfide to the reaction zone. It is therefore preferred that from about 2.5 to about 20% of the hydrogen sulfide in the feed gas stream is removed from the feed gas stream in the initial absorption zone. The size of the two absorption zones and the relative flow rates of the carbonate solution through them are set by this preference on the hydrogen sulfide pickup in the initial absorption zone. Those skilled in the art will readily recognize that as previously described, the two absorption zones could be present in a single vertical column if the proper vessel internals are provided. It may also be noted that the reaction between hydrogen sulfide and thiosulfate may be performed at any other point in the process where conditions permit. Since the thiosulfate will circulate throughout the process in the carbonate solution, the reaction may be performed at any point in the process flow at which sufficient hydrogen sulfide is present. The rate of the reaction may of course not be as high as desired if the temperature is too low. The embodiment of the process shown in the drawing is preferred since it will ensure that a high concentration of the hydrogen sulfide is available for the reaction of the thiosulfate and allows independent temperature control of the reaction zone.

Those skilled in the art will recognize that the basic process of the subject invention may be varied considerably. These modifications include the previously described variations in the design and operation of the absorption zone, as by the integration of the preferred separate absorption columns into a single absorption column, or the elimination of the thiosulfate reduction reaction zone. Other changes are possible in the design and operation of both the phase separation zone and the stripping zone. Furthermore, the process flow may be somewhat modified by passing a portion of the carbonate solution around the oxidation zone in the manner shown in the drawing. Preferably, this is only a small portion of the carbonate solution. This may be done when the presence of hydrogen sulfide in the carbon dioxide off-gas stream is acceptable. This mode of operation may also be desirable to reduce the quantity of liquid sulfur which is produced by the process while simultaneously treating the gas stream. It is to be noted that by passing a portion of the carbonate solution around the oxidation zone, there will result the passage of hydrogen sulfide-containing carbonate solution into the stripping zone. This may therefore result in the production of liquid phase sulfur in the stripping zone by the reduction of the thiosulfate by reaction with hydrogen sulfide. Provision is preferably made in this case for the separation of the resultant liquid phase sulfur from the carbonate solution prior to the carbonate solution being pressurized for recycling to the absorption zone.

A further potential variation in the subject process is the passage of carbon dioxide into the oxidation zone to prevent the system from becoming too highly alkaline. Yet another variation in the subject process is the passage of a small air stream or other oxygen-containing gas stream into an upper portion of the terminal absorption column to remove any residual amounts of hydrogen sulfide. This removal is by the oxidation of the hydrogen sulfide in the same manner as is effected in the oxidation zone. In yet another variation from the process of the drawing, substantial amounts of carbon dioxide may be allowed to remain in the treated product gas stream. This can be performed by reducing contacting time or carbonate circulation rates within the main absorption column or by limiting the regeneration of the carbonate solution in the stripping zone.

We claim as our invention:

1. A gas treating process which comprises the steps of:
  (a) contacting a feed gas stream which comprises a normally vaporous hydrocarbon, hydrogen sulfide and carbon dioxide with a hereinafter characterized first liquid stream, which comprises an aqueous carbonate solution, in an absorption zone operated under absorption conditions which promote the removal of hydrogen sulfide and carbon dioxide from the feed gas stream, and producing a treated gas stream and a second liquid stream comprising the aqueous carbonate solution, which is rich in hydrogen sulfide and carbon dioxide;
  (b) passing at least a portion of the second liquid stream into an oxidation zone wherein the second liquid stream is admixed with an oxygen-containing gas stream in the presence of an oxidation catalyst under conditions which promote the oxidation of hydrogen sulfide to sulfur, including a temperature at which sulfur is present as a liquid, and thereby effecting the production of a mixed phase stream comprising liquid sulfur and the aqueous carbonate solution, which contains thiosulfate ions and is rich in carbon dioxide;
  (c) separating the mixed phase stream in a phase separation zone and producing a liquid phase sulfur stream, which is withdrawn from the process, and a third liquid stream comprising the aqueous carbonate solution and which is rich in carbon dioxide; and,
  (d) passing the third liquid stream into a stripping zone operated at stripping conditions effective to effect the production of a first vapor stream comprising carbon dioxide, which is withdrawn from the process, and a fourth liquid stream comprising the aqueous carbonate solution which is lean in both hydrogen sulfide and carbon dioxide, and recycling at least a portion of the fourth liquid stream to the absorption zone as the previously referred to first liquid stream.

2. The process of claim 1 further characterized in that a fixed bed of oxidation catalyst is present within the oxidation zone.

3. The process of claim 2 further characterized in that the oxidation catalyst comprises a metal phthalocyanine compound.

4. The process of claim 3 further characterized in that an oxidation catalyst comprising a metal phthalocyanine compound is present in the aqueous carbonate solution which circulates through the process.

5. The process of claim 4 further characterized in that the oxygen-containing gas stream is air and in that a second vapor stream comprising residual components of the oxygen-containing gas stream is withdrawn from the phase separation zone.

6. The process of claim 5 further characterized in that the aqueous carbonate solution comprises a carbonate chosen from the group consisting of ammonia carbonate, sodium carbonate, and potassium carbonate.

7. The process of claim 6 further characterized in that a temperature between about 120° and about 220° C. is maintained at some point in the absorption zone.

8. The process of claim 6 further characterized in that the oxidation zone is maintained at a temperature between about 120° and about 220° C.

9. The process of claim 1 further characterized in that a fifth liquid stream comprising the aqueous carbonate solution, and which contains thiosulfate ions and is relatively rich in hydrogen sulfide, is withdrawn from the absorption zone and is passed into a reaction zone wherein thiosulfate is catalytically reduced to elemental sulfur by reaction with hydrogen sulfide.

10. The process of claim 9 further characterized in that a reaction zone effluent stream comprising the aqueous carbonate solution and elemental sulfur is passed into the oxidation zone.

11. A gas treating process which comprises the steps of:
  (a) contacting a feed gas stream which comprises a normally vaporous hydrocarbon, hydrogen sulfide, and carbon dioxide with a first liquid stream which comprises a lean aqueous carbonate solution containing thiosulfate ions in a first absorption zone operated under conditions which promote the selective removal of hydrogen sulfide from the feed gas stream and thereby producing a first vapor stream, which comprises the normally vaporous hydrocarbon, hydrogen sulfide, and carbon dioxide, and a second liquid stream comprising the aqueous carbonate solution and which is rich in hydrogen sulfide;
  (b) contacting the first vapor stream with a third liquid stream which comprises a lean aqueous carbonate solution in a second absorption zone operated under conditions which effect the removal of hydrogen sulfide and carbon dioxide from the first vapor stream and thereby producing a treated gas stream, which is withdrawn from the process, and a fourth liquid stream comprising the aqueous carbonate solution and which is rich in hydrogen sulfide and carbon di- oxide;
  (c) passing the second liquid stream through a reaction zone in which a reaction between hydrogen sulfide and a thiosulfate is catalytically promoted at conditions which result in the formation of sulfur;

(d) contacting at least major portions of the second liquid stream and the fourth liquid stream with an oxygen-containing gas stream in an oxidation zone in the presence of an oxidation catalyst under conditions which promote the oxidation of hydrogen sulfide to sulfur, including a temperature at which sulfur is present as a liquid, and effecting the production of a mixed phase stream comprising liquid sulfur, the aqueous carbonate solution and residual compounds present in the oxygen-containing gas stream;

(e) separating the mixed phase stream in a phase separation zone and thereby producing an effluent gas stream, a liquid phase sulfur stream which is withdrawn from the process, and a fifth liquid stream comprising the aqueous carbonate solution and which is rich in carbon dioxide; and, (f) releasing carbon dioxide from the fifth liquid stream in a stripping zone operated at stripping conditions and thereby producing a second vapor stream, which comprises carbon dioxide, and is withdrawn from the process, and a sixth liquid stream comprising an aqueous carbonate solution comprising thiosulfate ions which is lean in both hydrogen sulfide and carbon dioxide, and recycling at least a portion of the sixth liquid stream to the first and the second absorption zones as the first and the third liquid streams.

12. The process of claim 11 further characterized in that a fixed bed of an oxidation catalyst comprising an activated charcoal is present in the oxidation zone.

13. The process of claim 11 further characterized in that the reaction between hydrogen sulfide and the thiosulfate is catalyzed by catalyst comprising a metal phthalocyanine compound.

14. The process of claim 13 further characterized in that an oxidation catalyst comprising a metal phthalocyanine compound is present in the aqueous carbonate solution which circulates through the process.

15. The process of claim 14 further characterized in that a fixed bed of oxidation catalyst comprising a metal phthalocyanine is present within the oxidation zone.

16. The process of claim 13 further characterized in that the reaction zone is operated at a higher temperature than the oxidation zone.

17. The process of claim 16 further characterized in that the oxidation zone is operated at a temperature above about 120° C.

18. The process of claim 17 further characterized in that the aqueous carbonate solution comprises a carbonate compound chosen from the group consisting of amaonia carbonate, sodium carbonate, and potassium carbonate.

19. The process of claim 18 further characterized in that the oxygen-containing gas stream passed into the oxidation zone comprises air.

20. The process of claim 11 further characterized in that a fixed bed of oxidation catalyst comprising a metal phthalocyanine compound is present within an upper portion of the second absorption zone, and in that an oxygen-containing vapor stream is passed into the second absorption zone at a point below the fixed bed of oxidation catalyst.

* * * * *